United States Patent [19]

Wortman

[11] Patent Number: 4,459,433
[45] Date of Patent: Jul. 10, 1984

[54] STATION IDENTIFICATION CIRCUIT ARRANGEMENT

[75] Inventor: Donald W. Wortman, Central Islip, N.Y.

[73] Assignee: TII Industries Inc., Copiague, N.Y.

[21] Appl. No.: 410,500

[22] Filed: Aug. 23, 1982

Related U.S. Application Data

[63] Continuation-in-part of Ser. No. 218,577, Dec. 22, 1980, abandoned.

[51] Int. Cl.³ .......................................... H04M 13/00
[52] U.S. Cl. .............................. 179/17 A; 179/18 FH
[58] Field of Search .............. 179/17 A, 17 R, 18 FH, 179/81 R

[56] References Cited

U.S. PATENT DOCUMENTS

| 4,001,512 | 1/1977 | Proctor et al. | 179/17 A |
| 4,054,942 | 10/1977 | Chambers, Jr. | 179/17 A |
| 4,079,205 | 3/1978 | Glenn | 179/17 A |
| 4,099,031 | 7/1978 | Proctor et al. | 179/17 A |
| 4,209,667 | 6/1980 | Simokat | 179/17 A |
| 4,310,723 | 1/1982 | Svala | 179/17 A |
| 4,324,953 | 4/1982 | Simokat | 179/18 FH |

Primary Examiner—Gerald L. Brigance
Attorney, Agent, or Firm—Martin Sachs

[57] ABSTRACT

A universal station identification circuit arrangement for use with central office equipment that utilizes either differential or longitudinal detection methods is adapted to be connected to the tip party's subscriber drop in a two-party line without requiring access to or rewiring of the tip party's telephone. The circuit arrangement may be fabricated in a single unit which may include a ringer isolator together with ANI mark circuits.

14 Claims, 2 Drawing Figures

STATION IDENTIFICATION CIRCUIT ARRANGEMENT

This application is a continuation-in-part application of a previously filed patent application Ser. No. 218,577, entitled Station Identification Circuit Arrangement, filed Dec. 22, 1980 which is presently abandoned.

BACKGROUND OF THE INVENTION

1. Field of the Invention

This invention relates to telephone system equipment that is used at the subscriber's end of a subscriber's line in conjunction with a telephone station, and in particular, to a universal station identification circuit arrangement which may include a ringer isolator and ANI (Automatic Number Identification) mark circuits which are detected by central office equipment utilizing either differential or longitudinal detection methods.

2. Discussion of the Relevant Art

Ringer isolator circuits are used to eliminate electrical noise that results from ringer ground connections during the talking state of a telephone call while the called and the calling parties are connected to each other. This is accomplished by keeping the telephone ringer isolated or disconnected from ground except for the periods when a central office ringing signal voltage is applied to ring the telephone.

ANI mark circuits (also referred to as station identification circuits) are used with plural party lines to identify toll calls dialed by a selected party (customarily the tip party as distinguished from the ring party) for billing purposes in an automatic number identification system.

Prior to this invention, it has generally been the practice to wire ringer isolator and ANI mark circuits directly into the telephone sets. It also has been a custom to incorporate the ANI mark circuits into the telephone sets at the time of manufacture, but to make the circuit connections in such a way that the ANI mark circuits remain inactive or disabled until such time that it is desired to install the telephone at a tip party station on a two-party line.

Because of this custom, service calls are frequently needed when a telephone set is later assigned to a new or different subscriber for the purpose of converting the set in some cases to single party or ring party use and in other cases to tip party use. Many times existing telephones already installed are not equipped with ANI mark circuits. If conversion is required for tip party use, a service call is required, and physical access to the telephone is needed in order to make a modification to utilize a circuit arrangement which must be installed in the instrument itself. In addition, house calls are required to equip subscriber's telephones with the type of ringer isolator that is installed in the telephone itself.

In order to avoid the requirement of obtaining access to the physical telephone instrument, many circuits have been devised to provide the ANI mark equipment in such a way that it need not be physically housed in the instrument itself. One example of such an ANI mark circuit is shown in FIG. 2 of U.S. Pat. No. 4,001,512 issued to D. F. Proctor on Jan. 4, 1977. Another example of this type of circuit is disclosed in U.S. Pat. No. 4,054,942 issued to C. W. Chambers, Jr., on Oct. 18, 1977.

Both of these ANI mark circuits may be installed without requiring access to the subscriber's telephone. As a result no changes are required in the telephone itself or in the wiring to the telephone to divert the telephone station to tip party use on a two-party line. The ANI mark circuits described in the above mentioned patents, however, have serious drawbacks.

In both patents, for example, the circuit designs are such that insertion or line losses are created by electrical components which are connected in the subscriber loop itself in series with one or both of the different conductors. In U.S. Pat. No. 4,054,942 and in one of the embodiments of Pat. No. 4,001,512 there is the additional problem of electrical noise which is created by grounding one of the two subscriber line conductors (usually the tip conductor) through a resistor, but not the other conductor in the course of establishing the ground mark.

In another type of prior ANI mark circuit, the base-emitter junction of a bipolar transistor is connected across a resistor that is in series with the tip conductor of the tip party's drop, and the collector of the transistor is connected to ground through a resistor (usually 2.6K ohms). With this circuit design, loop current flow in the top party's loop circuit turns on the transistor to create a difference in the current flowing in the tip and ring conductors. The resulting current difference is sensed by ANI equipment in the central office. This ANI station identification circut is referred to as the differential type and cannot be employed with the longitudinal type of identification in which a current path to ground is sensed at the central office to identify the calling party as the tip party.

Examples of prior ringer isolator circuits are described in U.S. Pat. No. 3,916,111 issued to H. W. Ott on Oct. 28, 1975, U.S. Pat. No. 3,303,289 issued to M. S. Hawley, et al on Feb. 7, 1967 and U.S. Pat. No. 3,230,316 issued to P. M. Hunt on Jan. 18, 1966.

These patented ringer isolator circuits for the most part are normally wired into the telephone set itself and therefore, present a problem of obtaining access to the telephone to make the installation as mentioned earlier.

In U.S. Pat. No. 4,331,838 issued to F. L. Simokat on May 25, 1982 (Ser. No. 143,137 Filed Apr. 23, 1980) a station identification circuit arrangement is disclosed that is capable of being installed external to the telephone instrument and may be utilized with telephone central offices that provide either differential or longitudinal interrogation methods for identifying the calling party. However, this circuit arrangement has shortcomings which are overcome by the instant invention.

The present invention avoids the foregoing problems and drawbacks, as well as, offering additional advantages as will become apparent from the following summary and description.

SUMMARY OF THE INVENTION

The present invention utilizes a ringer isolator circuit capable of operating with reduced ringer voltages and a novel ANI mark or station identification circuit which may be used individually or combined into a common unit for connection to a subscriber's drop without requiring access to or rewiring of the subscriber's telephone. The unit containing the combined, electrically compatible ringer insulator and ANI mark circuits may also optionally include a station protector such as a gas tube arrestor. The present circuit arrangement is capable of being used with central office equipment that uses either differential or longitudinal detection method.

When the differential detection method is used the ANI mark circuit arrangement provides a ground mark circuit responsive to the initial loop current flow when the tip party's telephone is lifted off-hook and enables a ground mark switching circuit to apply a tip-to-ground and ring-to-ground mark. The application of a balanced tip-to-ground mark and ring-to-ground mark through equal resistances is sensed by central office equipment utilizing a differential detection method.

When a central office utilizes a longitudinal detection method generally, −48 volts is either placed on the tip, or tip and ring shorted together and the present circuit arrangement senses the momentary loss of loop current and places a tip-to-ground mark completing a current path to ground which is sensed by a central office utilizing the longitudinal detection method.

The ANI mark circuit of this invention is designed in such a way that practically no insertion or line losses or imbalances are introduced into the tip party's line. Furthermore, the ANI mark circuit of this invention operates to remove the differential ground mark during open loop-dialing pulses to avoid distortion of the pulses.

With the foregoing in mind, a major object of this invention is to provide a novel ANI mark circuit which is not subject to the previously described disadvantages of prior ANI mark circuits and may be utilized with central office equipment utilizing either differential or longitudinal detection methods.

A ringer isolator circuit which is suitable for use with this invention is disclosed in U.S. Pat. No. 4,331,838 (Ser. No. 143,137 filed Apr. 23, 1980) issued to F. L. Simokat on May 25, 1982.

An object of this invention is to provide a novel ANI mark circuit which applies a ground mark in response to the interruption of loop current after the tip party's telephone has been lifted off-hook and also provides a mark in response to loop current flow when the tip party telephone is lifted off-hook and which is utilizable with central office equipment that uses either differential or longitudinal detection methods.

Another object of this invention is to provide a novel ANI mark circuit which removes the differential ground mark during open loop dialing impulses to avoid distorting of the pulses.

A further object of the present invention is to provide a novel ANI mark circuit which reliably provides a dial squelch during dialing.

Yet another object of the present invention is to provide a novel ANI mark circuit arrangement that prevents a mark from being applied for more than 200 milliseconds after going to an on-hook state and prevents application thereof again, until the tip party again comes off-hook.

A universal station identification circuit arrangement providing first and second ground marks for use with central office equipment utilizing either differential or longitudinal detection methods for identifying a preselected one of two parties on a two-party line in a telephone system when a call is initiated from the preselected party's telephone, according to the principles of the present invention, comprises a capacitor and means for charging the capacitor with loop current flowing in the preselected party's subscriber drop when the flow of loop current is initiated by lifting the preselected party's telephone off-hook to provide a charge on the capacitor before momentary interruption of the loop current occurs. Also included are current conducting means, semiconductor means for directing the discharge current of the capacitor through the current conducting means and an active semiconductor connected in series therewith when a momentary interruption occurs in the loop current after the preselected party's telephone is off-hook to initiate a call. Further included are means under the control of the current conducting means for coupling a first ground mark to at least the tip conductor of the line connecting the selected party's telephone to the central office whenever the capacitor discharges through the current conducting means. In addition, means are included for providing the second ground mark which is normally disconnected from the line when the preselected party's telephone is on-hook, and means responsive to any momentary interruption of loop current that occurs after the flow of loop current is established by lifting the preselected party's telephone off-hook for causing the third means to apply the second mark to the tip conductor of the line.

The foregoing and other objects and advantages will appear from the description to follow. In the description, reference is made to the accompanying drawing which forms a part thereof, and in which is shown by way of illustration, a specific embodiment in which the invention may be practiced. This embodiment will be described in sufficient detail to enable those skilled in the art to practice the invention, and it is to be understood that other embodiments may be utilized and that structural changes may be made without departing from the scope of the invention. The following detailed description is, therefore, not to be taken in a limiting sense, and the scope of the present invention is best defined by the appended claims.

BRIEF DESCRIPTION OF THE DRAWINGS

In order that the invention may be more fully understood, it wll now be described, by way of example, with reference to the accompanying drawing in which.

DESCRIPTION OF THE PREFERRED EMBODIMENT

Figure 1:
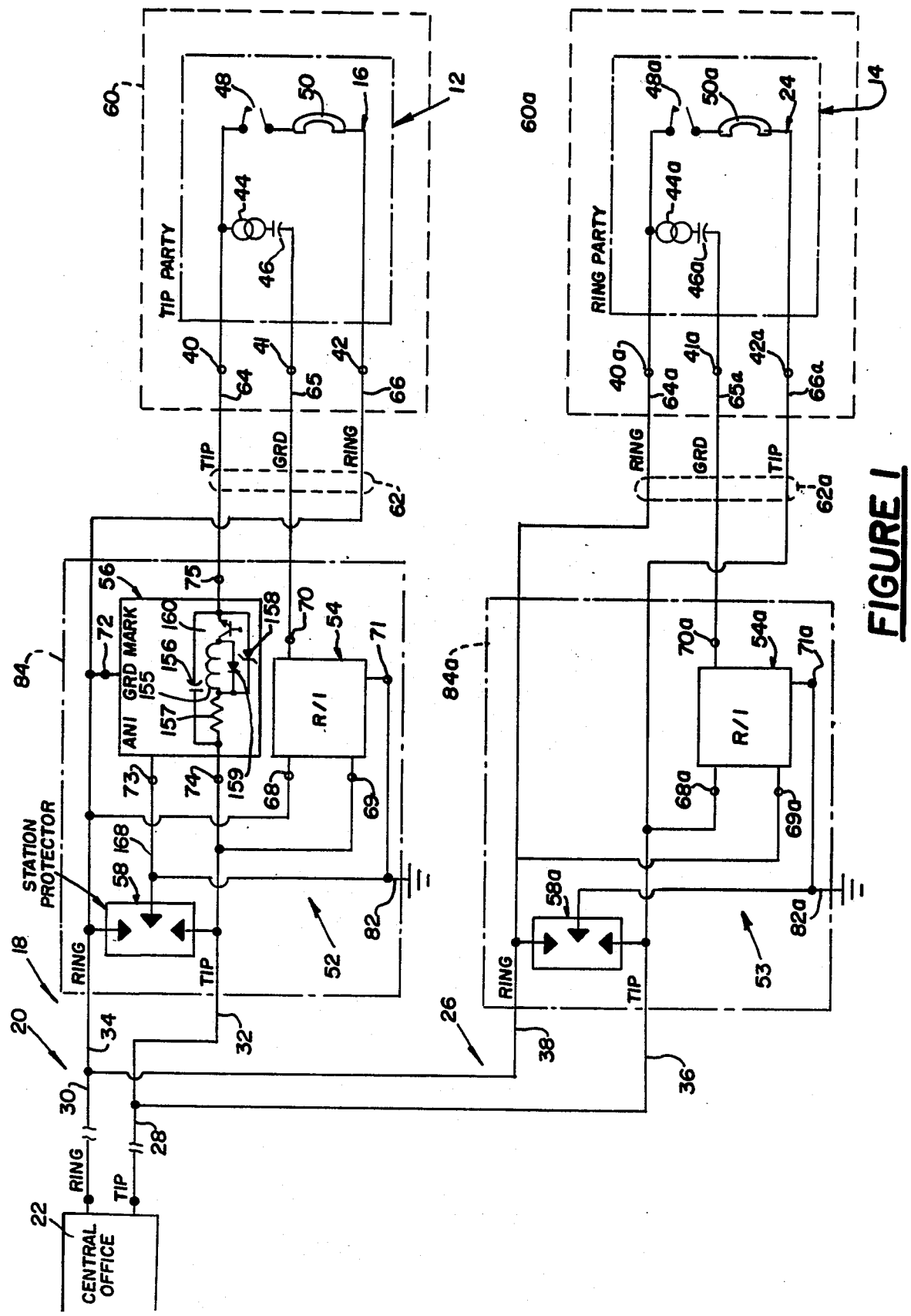
FIG. 1 is a schematic diagram of a two-party telephone system incorporating the principles of the present invention.

Referring now to the figures, and in particular, to FIG. 1 where a two-party subscriber loop circuit incorporating the principles of the present invention is shown comprising a tip party telephone station 12 and the ring party telephone station 14.

The telephone set 16 and the tip party station 12 is connected by way of a subscriber's drop 18 (sometimes referred to as a drop wire) and a telephone or transmission line 20 to a central office 22. The telephone set 24 in the ring party station 14 is connected by a separate subscriber's drop 26 and line 20 to the central office 22.

The line 20 is common to telephone stations 12 and 14 and has tip and ring conductors 28 and 30 as shown. Drop 18 and line 20 combine to define a first subscriber's loop or line for the tip party; and drop 26 and line 20 combine to define a second subscriber's loop or line for the ring party.

Still referring to FIG. 1, the subscriber drop 18 has tip and ring conductors 32 and 34, respectively, which connect to the tip and ring conductors 28 and 30, respectively, of line 20. Likewise, drop 26 has tip and ring conductors 36 and 38, respectively, which connect to the tip and ring conductors 28 and 30 of line 20.

Telephone set 16 comprises a conventional three wire circuit having three terminals 40, 41, and 42 for making wiring connections to the plant or facility outside of the subscriber's dwelling. As shown, set 16 includes a ringer 44 and a capacitor 46 connected in series between terminals 40 and 41 and also a hook switch 48 and a handset 50 connected in series between terminals 40 and 42.

The ring party's telephone set 24 is the same as the tip party's telephone set 16. Like reference characters have, therefore, been applied to designate corresponding components of sets 16 and 24 except that the reference numerals for set 24 have been suffixed by the letter "a" to distinguish them from the reference numerals applied to set 16.

The tip and ring party's station units incorporating the principles of the present invention are respectively indicated at 52 and 53 in FIG. 1. The tip party unit 52 is connected to the subscriber's end of drop 18, and the ring party unit 53 is similarly connected to the subscriber's end of drop 26. In the preferred embodiment unit 52 comprises a ringer isolator 54 and an ANI ground mark station identification circuit arrangement 56. A station protector 58 may optionally be included in unit 52 as shown. The station protector 58 may be a conventional three electrode gas tube surge arrestor such as the series TII-300 manufactured by the TII Corporation, Lindenhurst, N.Y.

Unit 52 is normally located outside of the tip party's home or building which houses telephone set 16 and which is schematically indicated in dashed lines at 60 in FIG. 1. Terminals 40 through 42 of telephone set 16 are connected by a three conductor station wire 62 to unit 52 in a manner to be described hereinafter.

As shown, the three conductors of the station wire 62 are indicated at 64, 65 and 66 in FIG. 1 and are respectively connected to terminals 40, 41 and 42. In this embodiment, the ringer isolator is provided with four operating terminals 68, 69, 70 and 71, and the ANI mark circuit 56 also has four terminals as indicated at 72, 73, 74 and 75.

As shown, the ring side or ring conductor 34 of drop 18 is connected to one end electrode of the gas tube surge protector 58, to terminals 68 and 72 and through conductor 66 to terminal 42. The tip side or tip conductor 32 of drop 18 is connected to the other end electrode of protector 58, and to terminals 69 and 74.

In the ANI mark circuit 56, a series current conducting path is established between terminals 74 and 75 through a relay 155, a resistor 157, and a transistor 160 connected in series. A zener diode 158 is connected in parallel with the serially connected relay 155 and the transistor 160, and a diode 159 is connected across the relay 155 as shown. A capacitor 156 is connected in parallel with the series connection of relay 155, resistor 157 and transistor 160, thus, providing an AC and DC path to extend the tip side of the line. Conductor 64 connects terminals 75 to terminal 40. The center electrode of protector 58 and terminals 71 and 73 are all connected by a common ground wire 82 to earth ground.

With the circuit connections just described for the gas tube protector 58, the gas tube will fire when lightening or other induced surge occurs to cause both the tip and ring sides of drob 18 to become grounded through the gas tubes high conductivity ion path to the tubes center electrode which is connected to earth ground. The gas tube protector 58 may also be of a two element construction well known in the art.

In addition to being electrically combined or connected in unit 52 in the manner shown, protector 58, ring isolator 54 and the ANI mark circuit 56 may advantageously be incorporated into a common package or container which is schematically indicated at 84 in FIG. 1.

Alternatively, protector 58 may be located outside of unit 52 and container 84. With such an arrangement unit 52 will consist of ringer isolator 54 and the ANI mark circuit 56 and may be mounted at protector 58. In either case, unit 52, with or without protector 58, makes access to or rewiring of the station telephone 16 unnecessary.

Moreover, the ringer isolator 54 and the ANI mark circuit 56 may be used individually as separate components. As is apparent, access to or rewiring of the subscriber's telephone is also unnecessary when either the ringer isolator 54 or the ANI mark circuit 56 is used individually.

The ring party unit 53 is the same as the tip party unit 52 except that it does not have an ANI ground mark station identification circuit. Additionally, the circuit connections to the telephone set 24 and the ringer isolator in unit 53 differ as will be described in detail later on. To the extent that unit 53 is the same as unit 52, line reference numerals suffixed by the letter "a" have been applied to designate corresponding components of unit 53.

Ringer isolator 54a is the same as ringer isolator 54 as previously mentioned, and it makes no difference if the terminals are reversed. In the case of ringer isolator 54a, terminal 68a is connected to tip conductor 36, and terminal 69a is connected to ring conductor 38. Additionally, ringer 44a and capacitor 46a are connected between the grounding terminal 70a and the ring conductor 38 of drop 26 in order to provide the potential for ringing the ring party's ringer 44a.

Figure 2:
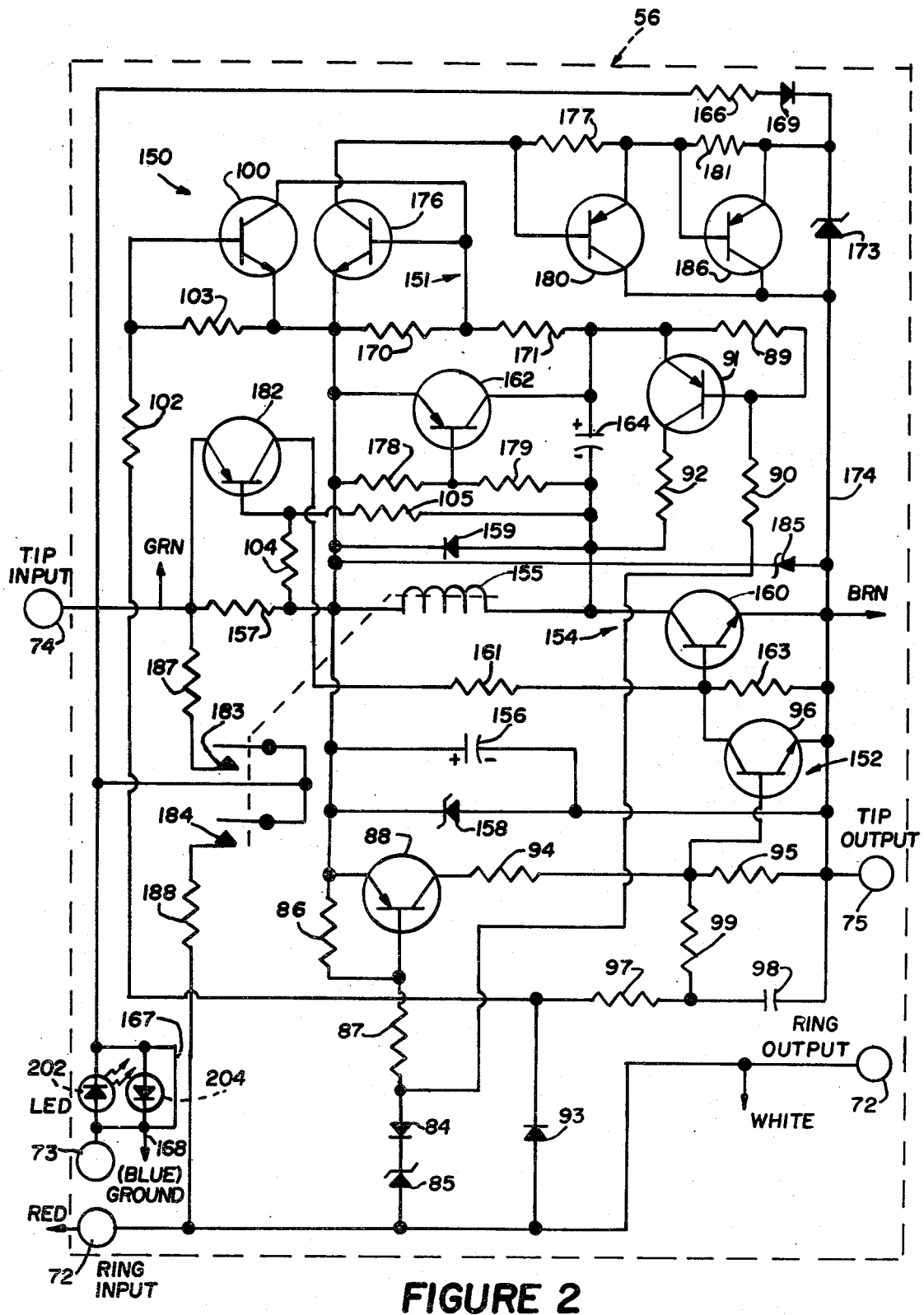
FIG. 2 is a schematic circuit diagram of the universal station identification circuit arrangement (ANI mark circuit) of the present invention.

Referring now to FIG. 2, ANI mark circuit 56 (also called the tip party's station identification circuit) is shown to mainly comprise a longitudinal ground mark squelch circuit 150, a longitudinal mark control circuit 151, a differential squelch circuit 152, a loop current sensing control circuit 153 and a differential switching control circuit 154. The circuit arrangements as described above, have been named for convenience to relate to the type of sensing utilized by the central office equipment. The longitudinal circuits will provide the ground mark with central office equipment utilizing the longitudinal method for interrogating a ground mark at the tip party line while the differential circuit arrangements will be utilized by central office equipment which determine the tip party utilizing differential sensing (interrogating) techniques.

In the idle state, with the telephone handset 50 in its on-hook position, no loop current flows in either of the subscriber's drops 20 and 26 and −50 volts D. C. is connected to the ring terminal 72 and "0" volts is connected to the tip terminal 74. Terminal 73 is connected to a ground reference. The −50 volts permits diode 84 to conduct breaking down zener diode 85, which preferably has a 20 volt breakover voltage. The current flow through diodes 84 and 85 flows through biasing resistors 86 and 87 and biasing resistors 89 and 90 to bias transistors 88 and 91 on (low impedance state) and will discharge capacitor 164, via resistor 92 and the emitter-collector electrodes of transistor 91. Since no loop current is flowing, there is no voltage drop between the tip in terminal 74 and the tip out terminal 75 and all capacitors have been discharged. All of the remaining transistors are in their off state providing a relatively high impedance between their emitter-collector electrodes.

Briefly, the circuit arrangement of capacitors 156 and 164; and transistors 160, 162, 176, 180 and 186 are responsive to loop current flow when the tip party's telephone 16 is lifted off-hook to enable capacitors 156 and 164 to charge. When the central office lifts loop current off line 20 (i.e., momentarily interrupts loop current) to interrogate the two-party subscriber loop circuit for the presence of a ground mark (i.e., the establishment of a current path to ground), circuit 151 operates on the discharge of capacitor 164 via resistors 170, 171 and relay coil 155. The current discharge from capacitor 164 operates (turns on) a device (in this case transistors 176, 180 and 186) which causes a ground mark to be applied to the tip party's drop 18. Once capacitor 156 reaches approximately one volt, bias current fed from the voltage divider comprising resistors 161 and 163 changes transistor 160 to its low impedance or conducting state effectively placing relay coil 155 in series with the loop current path. When the current through relay coil 155 reaches approximately 15 milliampers, it operates closing contacts 183 and 184, thereby placing resistor 187 from the tip input terminal 74 to ground terminal 73, via conductor 167 and contact 184 connects resistor 188 to ground in a similar manner providing the differential mark. Zener diode 158 limits the voltage across the relay coil 155 to 2.7 volts D.C..

The ANI equipment in the central office senses the application of the ground mark (i.e., ground current path) to identify the calling party as the tip party and to provide the operation for billing the call to the tip party in the event that the dialed call is a toll call. Since the ring party has no ANI mark circuit, no ground mark will be applied to the ring party's subscriber drop or loop circuit when the ring party comes off-hook to initiates a call. Thus, when the central office equipment initiates a toll ticketing condition by lifting the loop current off line 20, no ground mark will be sensed by the ANI equipment in the case where the ring party is marking the call. As a result, the ANI equipment will identify the party making the call as the ring party and will operate to bill the ring party in the event that the call is a toll call. In this manner the party dialing the toll call will be identified for billing purposes.

Referring now in greater detail to FIG. 2, the ground mark switching circuit 151 which functions in cooperation with a central office automatic toll ticketing mechanism using a longitudinal sensing method comprises a ground mark resistance 166 which preferably is approximately 2.2k Ohms. One end of resistor 166 is normally connected to terminal 73 via a conductor 167. Terminal 73, in turn, is coupled to ground, via a conductor 168 and conductor 82. The other side of resistor 166 is connected to the anode electrode of diode 169. Th cathode electrode of diode 169 is connected to the emitter electrode of transistor 186. Transistors 180 and 186 form a Darlington circuit arrangement and function as the longitudinal ground mark switch. The collector electrodes of transistors 180 and 186 are connected to the tip out terminal 75, via a conductor 174. A zener diode 173 is connected across the emitter-collector electrodes of transistor 186 to protect if from over-voltage surges.

A resistor 177 is connected between the emitter-base electrodes of transistor 180 and a resistor 181 is connected between the emitter-base electrodes of transistor 186. The base electrode of transistor 180 is connected to the collector electrode of transistor 176. The base electrode of transistor 176 is connected to the juncture of serially connected resistors 170 and 172, which is connected across the emitter-collector electrodes of transistor 162. The emitter electrode of transistor 162 is connected to the emitter electrode of transistor 176. The base electrode of transistor 162 is connected to the juncture of serially connected resistor 178 and 179. The other end of resistor 178 is connected to the emitter electrode of transistor 162. Capacitor 164 is connected between the collector electrode of transistor 162 and the other end of resistor 179. Serially connected resistors 178 and 179 are connected across relay coil 155 and has the diode 159 connected in parallel therewith, with its cathode electrode connected to the emitter electrode of transistor 162 and its anode electrode connected to the other end of resistor 179.

Thus, after loop current has been flowing in the subscriber's party drop and capacitor 164 has been permitted to become fully charged, an interruption of the loop current, as is caused by a longitudinal interrogation system, will permit capacitor 164 to discharge through resistors 170 and 171 and relay coil 155, thereby causing transistor 176 to turn on (become a relatively low impedance) drawing current thru resistor 177 which in turn will bias Darlington transistors 180 and 186 into their low impedance state coupling longitudinal ground mark resistor 166, via diode 169 and transistor 186 to tip output terminal 75 from ground terminal 73. Thus, completing the current path to ground by providing a resistance across terminals 73 and 75 which bridges the tip conductor to ground from the tip party's drop 32 during interrogation by the central office. Under normal standby conditions with the handset 50 in its on-hook position, switch 48 is open preventing the flow of loop current. Transistors 162, 176, 180 and 186 will be in their non-conducting or high impedance state, therefore the mark (current path to ground) will be open and the ground mark will be removed.

When the handset 50 is removed to the off-hook position, switch 48 closes and loop current will flow because of the $-48$ volts appearing on the ring line 34 which is connected to terminal 72. The tip line 32 connected to terminal 74 is placed at ground potential by the central office. Current will flow, therefore, from terminal 74 through, capacitor 156, switch 48, handset 50 to terminal 72 permitting capacitor 156 to charge rapidly. The current flow through resistor 157 will turn on (change to its relatively low impedance state) transistor 182 allowing current to flow from its emitter to collector electrodes and through resistors 161 and 163 which are connected in series. The juncture of resistors 161 and 163 is connected to the base electrode of transistor 160. The other end of resistor 161 is connected to the collector electrode of transistor 182 and the other end of the resistor 163 is connected to the emitter electrode of transistor 160. With current flow to resistor 163 transistor 160 is biased to its low impedance state permitting current to flow through relay coil 155 and through the collector-emitter electrodes of transistor 160.

As the voltage starts to rise across capacitor 156 the voltage across relay coil 155 increases so that the voltage appearing across voltage divider 178 and 179 increases to a point where transistor 162 is biased to its low impedance state permitting capacitor 164 to charge rapidly to a value which is essentially equal to the voltage appearing across relay coil 155 less the emitter-collector electrode voltage drop of transistor 162, which is very small.

Upon interruption of the loop current by the central office, capacitor 164 will discharge through resistors 170, 171 and coil 155 permitting transistors 176, 180 and 186 to remain in their low impedance state sufficiently long to place the mark resistance 166 from ground to the tip side of the line. This action is sufficiently fast to place a mark interdigitally which may be used for Stroger Automatic and Toll Ticketing (SATT) ANI systems. By choosing the proper time constants of R and C the mark may be made to remain for as long as several seconds or as short as a few milliseconds, if required.

In order to insure that the mark circuit will permit current flow in only one direction through transistor 186, a diode 69 is placed in series with resistor 166, thereby further protecting transistor 165 from damage.

If the subscriber should begin dialing at this point, the dial switch will alternately break and make the loop current path for each increment of the number being dialed. For instance, the number 3 is dialed, loop current is stopped and started three times. The time intervals being about 60 milliseconds off and 40 milliseconds on. If the differential mark resistor 188 remains on during the time the loop current is turned off, it could hold the central office relay on which would introduce dialing distortion. When loop current stops, the voltage from tip terminal 74 to ring terminal 72 increases to 50 volts, diode 84 and zener diode 85 will conduct permitting bias current to flow turning on transistors 88 and 91 as explained hereinbefore. When transistor 88 turns on (changes to its relatively low impedance state) bias current is fed through resistors 94 and 95 generating a voltage across resistor 95 which turns transistor 96 to its on or a low impedance state. When transistor 96 turns on (low impedance between the collector-emitter electrodes) the bias current needed to hold transistor 160 to its on or low impedance state because of the charge stored in capacitor 156 is shunted away from the base electrode of transistor 160, thereby turning it off (emitter-collector electrodes are a relatively high impedance). With the emitter-collector electrodes of transistor 160 presenting a relatively high impedance in the series current path of relay coil 155 insufficient current flows to maintain the relay in its on condition. Thus, the relay is turned off in less than 2 milliseconds.

With the cessation of current through relay coil 155, the negative side of capacitor 164 is connected to the emitter electrode of transistor 176, via the coil 155. This allows the voltage appearing across capacitor 164 (approximately 1.5 to 2.5 volts) to appear across the voltage divider comprised of resistors 170 and 171, thereby turning transistor 176 to its on or low impedance state. As explained earlier, transistor 176, thereby supplies bias current to turn on Darlington pair of transistors 180 and 186 if there is sufficient voltage between the tip terminal 74 and ground terminal 73, as there would be in the SATT interrogation system. If it is not a SATT system, then the tip terminal 74 is at ground potential and no current will flow through transistors 180 and 186 or transistor 176.

If the on-hook state ("0") loop current) is caused by hanging up the telephone instrument 50 instead of dialing, the condition will be continuous instead of less than about 60 milliseconds. Transistor 91 will be turned on immediately when the on-hook state begins, however, resistor 92 will prevent the immediate discharge of capacitor 164. Resistor 92 maybe a thermistor to compensate for temperature caused variations in the relay coil 155 and the base-emitter electrode voltage of transistor 176 which may cause the turn-on voltage required to turn on transistor 176 to vary. Resistor 92 is selected to maintain the SATT mark for 100 milliseconds to 200 milliseconds. If, upon the tip party hanging up the phone the ring party picks up his phone within 100 milliseconds, the central office during interrogation could identify it as the tip party being off-hook. The odds are very great against this happening within the 100 milliseconds. However, the chances of this happening reduce very rapidly as the length of time increases.

When ringing voltage is placed on the tip party's line by the central office during the on-hook condition A. C. currents pass through the tip conductor which may exceed 100 milliamps. During part of the time the voltage between tip terminal 74 and ring terminal 72, which is placed at reference ground is positive on the tip terminal 74 and zero on the ring terminal 72 which operates the on-hook or dial squelch provided by transistors 91 and 88. However, during part of the time, the tip terminal is negative and the ring terminal is zero and at this same time, phase shifts between voltage and current through the reactance of the bell cause the tip current to be flowing in the proper direction to operate relay coil 155 and charge capacitor 164. To prevent this, diode 93 and resistor 97 charge capacitor 98 when the tip voltage goes negative. Capacitor 98 integrates these pulses to supply a relatively constant bias current to transistor 96 via resistor 99 to cause transistor 96 to change to its low impedance state. Therefore, transistor 96 remains with a relatively low impedance between its emitter-collector electrodes, thereby shunting away the bias current from transistor 160 causing transistor 160 to assume its high impedance state as described earlier. The voltage on capacitor 98 also supplies a bias current to transistor 100, via resistors 97 and 102, which provides current into the base electrode of transistor 100 and current to cause a voltage drop across resistor 103 to permit transistor 100 to be turned on and have a relatively low impedance between its emitter-collector electrodes. Transistor 100 shunts the bias current away from the base of transistor 176 causing transistor 176 to change to its relatively high impedance state between its emitter-collector electrodes, which in turn causes transistors 180 and 186 to be turned off. Therefore, neither the differential mark nor the longitudinal mark can be applied when ringing voltage is applied by the central office and there are no additional loads applied to the lines during ringing by the central office.

Resistor 177 connected between the emitter electrode and base electrode of transistor 180 insures that transistor 180 turns completely off. Zener diode 173 connected across the emitter-collector electrodes of transistor 186 protects transistors 176, 180 and 186 from overvoltages. Diode 159 connected across relay coil 155 functions to absorb inductive surges from the relay coil when it is turned off.

A current sensing arrangement comprising transistor 182, resistor 157 and resistor 104 senses the loop current and eliminates the possibility of only one side of the relay comprising coil 155 and contacts 183 and 184 from closing. A zener diode 185 connected from one end of resistor 104 to terminal 75 (Tip Output) permits transistor 182 to function after capacitor 164 has charged to the required voltage.

On reverting calls, where the two parties on the same line are talking to each other, loop currents can vary from about 4 milliamps to greater than 20 milliamps due to normal handling of the handset and talking. The current sensing circuitry prevents transistor 160 from turning on until more than 15 milliamps flows through the zener diode 158. Resistor 105 connected from the collector electrode of transistor 160 to the base electrode of transistor 182 provides hysteresis so that the current through relay coil 155 can be reduced to 12 milliamps before transistor 182 will turn off. Relay coil 155 can now be specified to turn on and complete the contact circuit path through both contacts 183 and 184 when more than 15 milliamps flows through the relay coil 155 and to insure that both relay contacts 183 and 184 remain closed with as low as 12 milliamps flowing through the relay coil. This is an improvement over a relay utilized in earlier prior art circuit arrangements which required that the relay turn on at less than 4 milliamps. The action of the present circuit arrangement may cause slight clicks when the relay closes or opens, but it is not found to be objectionable and is a considerable improvement over an arrangement wherein an unbalanced line is introduced because either one contact or the other completes the circuit.

In a typical crossbar central office switching system, the following sequence usually takes place to establish the toll ticketing condition after either one of the parties comes off-hook and before dial tone is supplied to the off-hook party. First, central office equipment will momentarily interrupt the loop current shortly after the party's telephone is lifted off-hook; shortly after, and while the loop current is still interrupted, the tip and ring conductors of line 20 are momentarily shorted together and the negative battery potential of −48 volts is supplied by the central office to the interconnected tip and ring conductors. Some central offices permit the ring conductor of line 20 to float and will apply the negative battery potential to the tip conductor instead of shorting the tip and ring conductor together and applying the negative battery voltage to both conductors. The ANI mark circuit 56 of the instant invention will work for both types of central offices.

After shorting the tip and ring conductors of line 20 together and applying the negative battery potentials to sense whether or not a ground mark has been applied, the central office crossbar systems restores loop current to the calling party subscriber loop and supplies the dialing tone to the calling party to permit the calling party to commence dialing. The central office senses the ground mark during the toll ticketing condition and identifies the calling party as the tip party. If the central office fails to sense the ground mark, it identifies the calling party as the ring party. After the dial pulsing is complete the central office transmits the identity of the calling party to the Centralized Automatic Message Accounting (CAMA) equipment to provide for the billing of the toll call, if one has been made, to the identified party.

As shown in FIG. 2, the conductor 167 may be replaced by a LED (Light Emitting Diode) 202 which is oppositely poled and connected in parallel with diode 204. Replacing conductor 167 with the parallel combination of LED 202 and diode 204 permits the mark current path when applied to include the LED. Thus, when the mark current flows through LED 202 it will emit rays of light indicating to an observer that the mark is on during this period of time. Diode 204 protects the LED from reverse currents which may damage it.

Hereinbefore has been disclosed a universal station identification circuit arrangement which may be utilized with central office equipment using either differential or longitudinal detection methods for detecting the tip party on a two-party line. It will be understood that various changes in the details, materials, arrangements of parts and operating conditions which have been therein described and illustrated in order to explain the nature of the invention may be made by those skilled in the art within the principles and scope of the present invention.

Having thus set forth the nature of the invention, what is claimed is:

1. A universal station identification circuit arrangement providing first and second ground mark current paths for use with central office equipment utilizing either differential or longitudinal detection methods for identifying a preselected one of two parties on a two-party line in a telephone system when a call is initiated from the preselected party's telephone, comprising:
   (a) a capacitor;
   (b) means for charging said capacitor with loop current flowing in the preselected party's subscriber drop when the flow of loop current is initiated by lifting the preselected party's telephone off-hook to provide a charge on said capacitor before momentary interruption of said loop current occurs;
   (c) current conducting means;
   (d) semiconductor means and an active semiconductor connected in series therewith for directing said loop current through said current conducting means after the preselected party's telephone is off-hook to initiate a call;
   (e) first means under the control of said current conducting means for coupling said first ground mark current path to at least the tip conductor of the line connecting said selected party's telephone to said central office whenever said loop current flows;
   (f) second means for coupling said second ground mark current path which is normally disconnected from said line; and
   (g) means responsive to any momentary interruption of loop current that occurs after the flow of loop current is established by lifting the preselected party's telephone off-hook for causing said second means to couple said second mark to the tip conductor of said line when said central office utilizes said longitudinal detection method.

2. A universal station identification circuit arrangement according to claim 1 wherein said active semiconductor is a transistor.

3. A universal station identification circuit arrangement according to claim 1 wherein said second means for providing said second ground mark current path includes means for charging said capacitor comprising first circuit means that normally provides a relatively low impedance current path across said capacitor to discharge and prevent charging of said capacitor when said selected party's telephone is on-hook to prevent the flow of loop current in the preselected party's subscriber drop, said first circuit means being responsive to the flow of loop current that is initiated by lifting said selected party's telephone off-hook to cause said relatively low impedance current path across said capacitor to become a relatively high impedance and second circuit means in series with said capacitor providing a relatively high impedance current path when said selected party telephone is on-hook, said second circuit means being responsive to the flow of said loop current to cause said relatively high impedance current path to become a relatively low impedance, thereby allowing said capacitor to be discharged by said loop current.

4. A universal station identification circuit arrangement according to claim 3 wherein said first circuit means includes a transistor and a biasing circuit arrangement for biasing said first transistor to a relatively low impedance only when said central office battery voltage across the tip and ring conductors of said preselected party's subscriber drop is above a preselected threshold that is greater than the D.C. voltage that appears across the tip and ring conductors of said preselected party's subscriber drop when loop currents is flowing in the preselected party's subscriber drop and said second circuit means includes a transistor and a biasing circuit arrangement for biasing said second transistor to a relatively low impedance only when said loop current is flowing in the preselected party's subscriber drop.

5. A universal station identification circuit arrangement according to claim 1 wherein said current conducting means includes relay winding means and wherein said means under the control of said current conducting means includes a set of contacts operated by the flow of current through said winding means to complete a current conducting path between earth ground and at least the tip conductor of the preselected party's subscriber drop to establish said first ground mark.

6. A universal station identification circuit arrangement according to claim 5 wherein said winding means is connected in series with a transistor, said transistor and winding means being connected in series with one of the tip or ring conductors or the preselected party's subscriber drop and wherein said transistor and winding means are connected in parallel with a second capacitor.

7. A universal station identification circuit arrangement according to claim 6 including means for biasing said transistor to a relatively high impedance when no loop current is flowing in said preselected party's subscriber drop and means for establishing a relatively high impedance for said transistor essentially preventing current flow through said winding means whenever the D.C. across the tip and ring conductors of said preselected party's subscriber drop is at a value that exists when the preselected party's telephone is on-hook, said transistor being biased to a relatively low impedance permitting current to flow therethrough and through said winding means in response to the reduction that takes place in the D.C. voltage across the tip and ring conductors of the preselected party's subscribers drop when the preselected party's telephone is lifted off-hook to initiate the flow of loop current.

8. A universal station identification circuit arrangement according to claim 1 further including means for indicating when said first means couples said first ground mark current path between earth ground and said tip conductor of the preselected party's subscriber drop, said indicating means being serially connected in said first ground mark current path.

9. A universal station identification circuit arrangement according to claim 8 wherein said indicating means includes a diode and a light emitting diode connected in parallel and oppositely poled, said light emitting diode permitting current flow therethrough and emitting light therefrom when current flows in said first or second ground mark current path.

10. A universal station identification circuit arrangement according to claim 1 further including circuit means for momentarily removing said first or second marks during interruptions of said preselected party's subscriber drop caused by the dialing by said preselected party.

11. A universal station identification circuit arrangement according to claim 1 further including first circuit means for causing said current conducting means to remove said first ground mark current path when the loop current is reduced below a predetermined value.

12. A universal station identification circuit arrangement according to claim 11 wherein said first circuit means for causing said current conducting means to remove said first ground mark current path is a transistor, said transistor being coupled to said active semiconductor connected in series with said current conducting means and causing said active semiconductor to become a high impedance when said loop current is less than said predetermined value.

13. A universal station identification circuit arrangement according to claim 1 wherein said second means includes circuit means for holding the application of said second mark current path to the tip conductor of said line for a predetermined time interval after the loop is interrupted by dialing.

14. A universal station identification circuit arrangement according to claim 1 further including means for indicating during longitudinal interrogation by said central office when said second means completes a second ground mark current path between earth ground and said tip conductor of the preselected party's subscriber drop to establish said second ground mark current path, said indicating means being serially connected in said second ground mark current path and said first ground mark current path.

* * * * *